Figure 4:
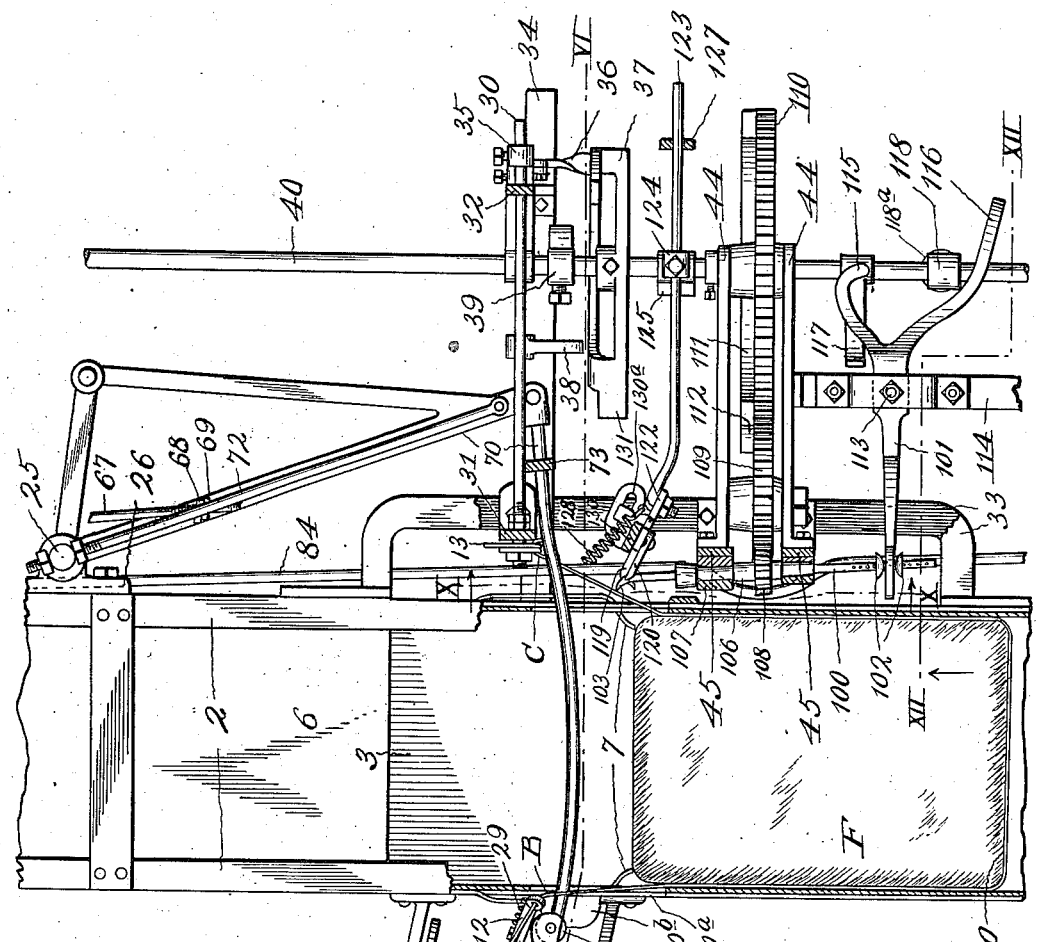

C. A. ROBBEN.
AUTOMATIC BINDING ATTACHMENT FOR BALING PRESSES.
APPLICATION FILED FEB. 24, 1909.
963,180.
Patented July 5, 1910.
9 SHEETS—SHEET 1.
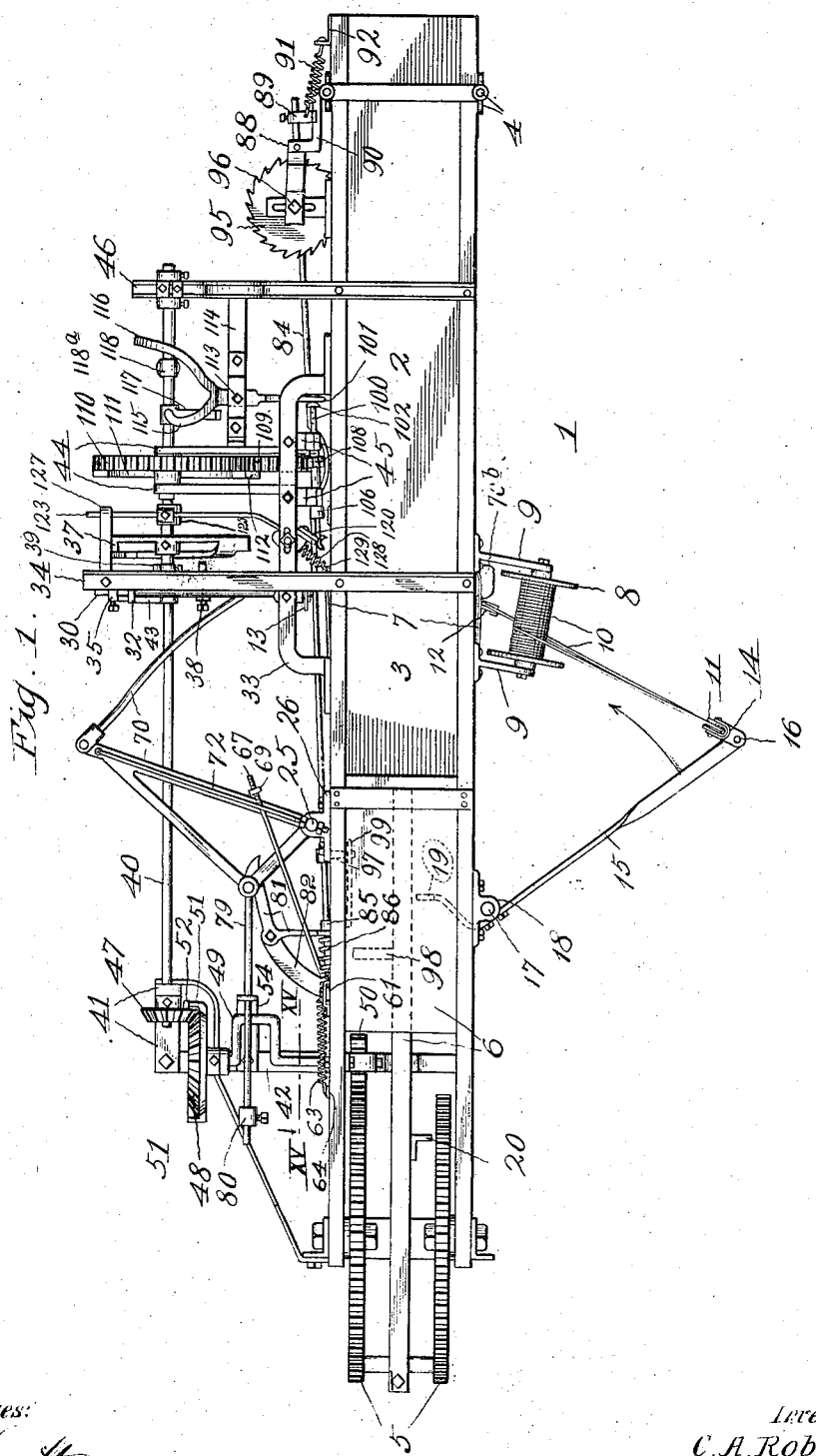
Witnesses:
Inventor,
C. A. Robben,
By F. G. Fischer,
Attorney.

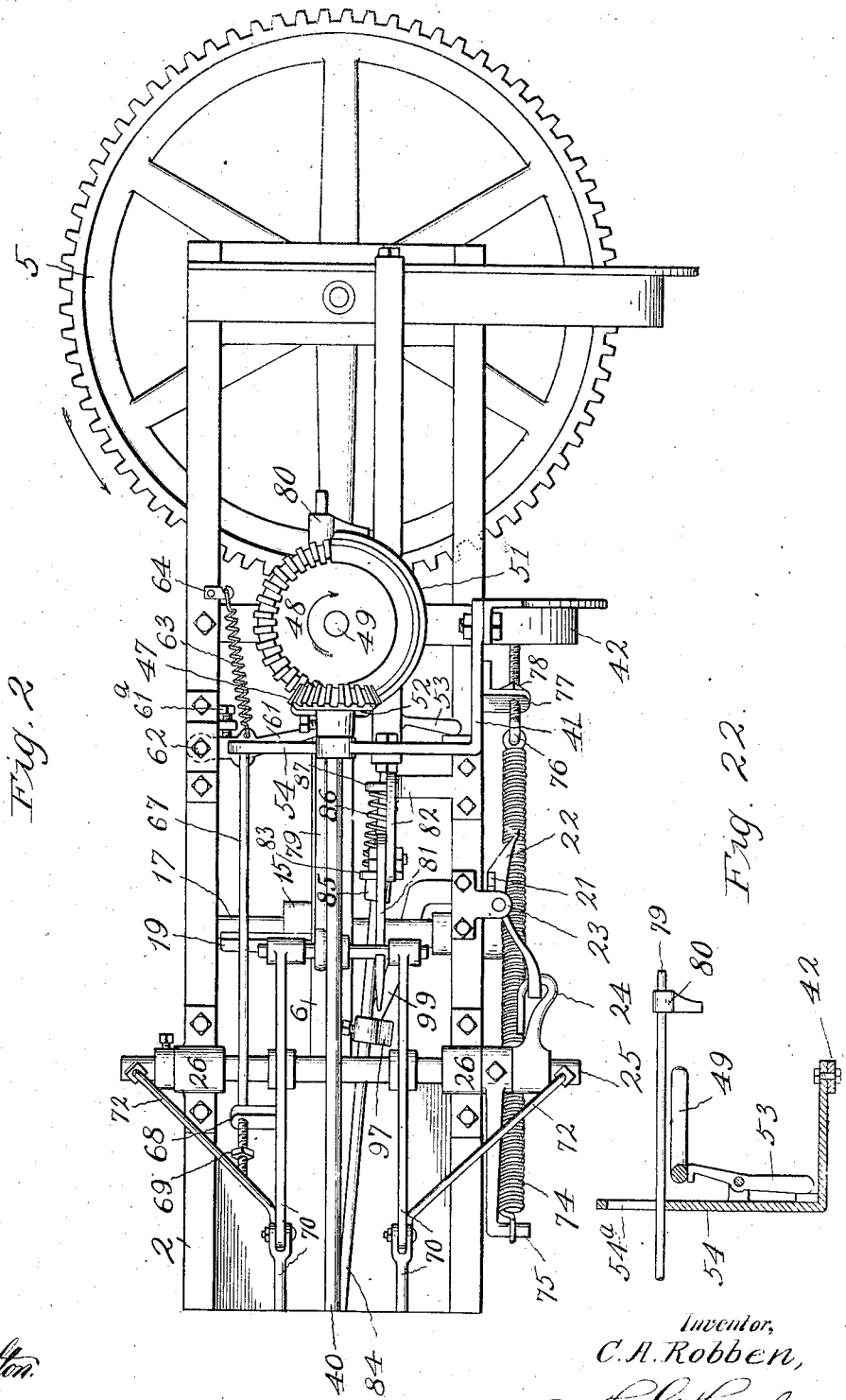

C. A. ROBBEN.
AUTOMATIC BINDING ATTACHMENT FOR BALING PRESSES.
APPLICATION FILED FEB. 24, 1909.
963,180.
Patented July 5, 1910.
9 SHEETS—SHEET 3.
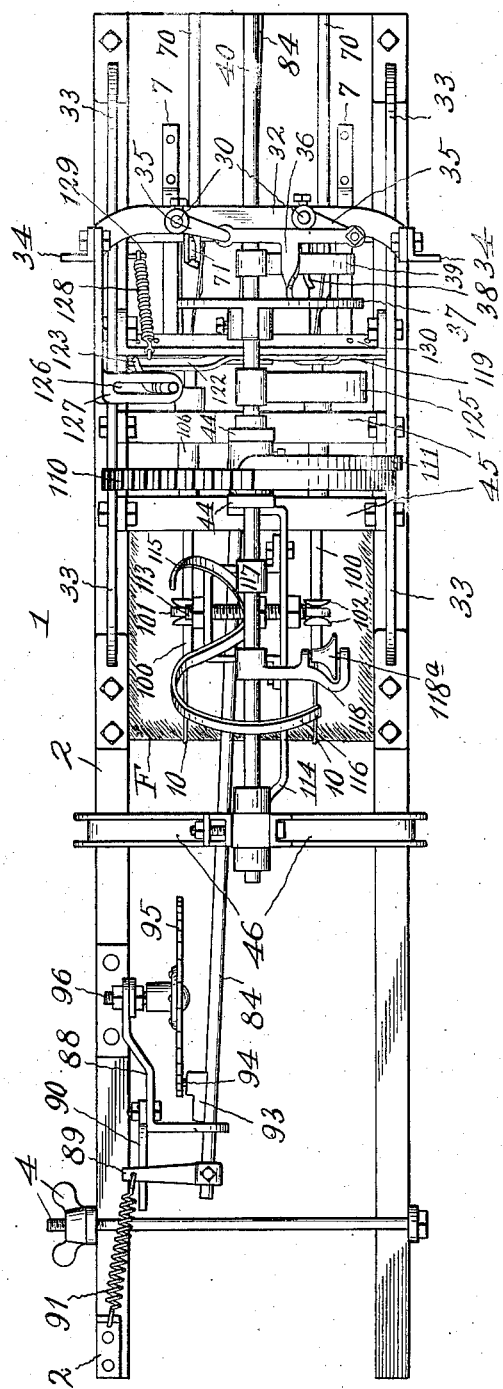
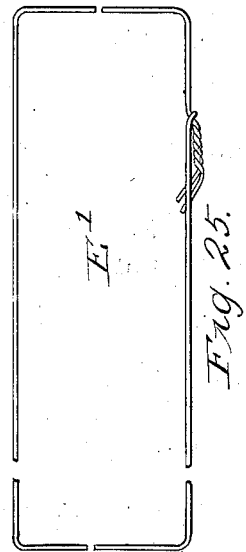
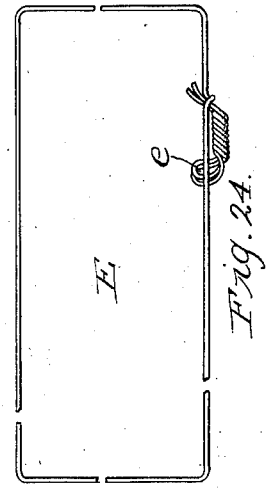
Witnesses:
R. E. Hamilton
M. Cox
Inventor,
C. A. Robben,
By F. G. Fischer,
Attorney.

C. A. ROBBEN.
AUTOMATIC BINDING ATTACHMENT FOR BALING PRESSES.
APPLICATION FILED FEB. 24, 1909.
963,180.
Patented July 5, 1910.
9 SHEETS—SHEET 5.
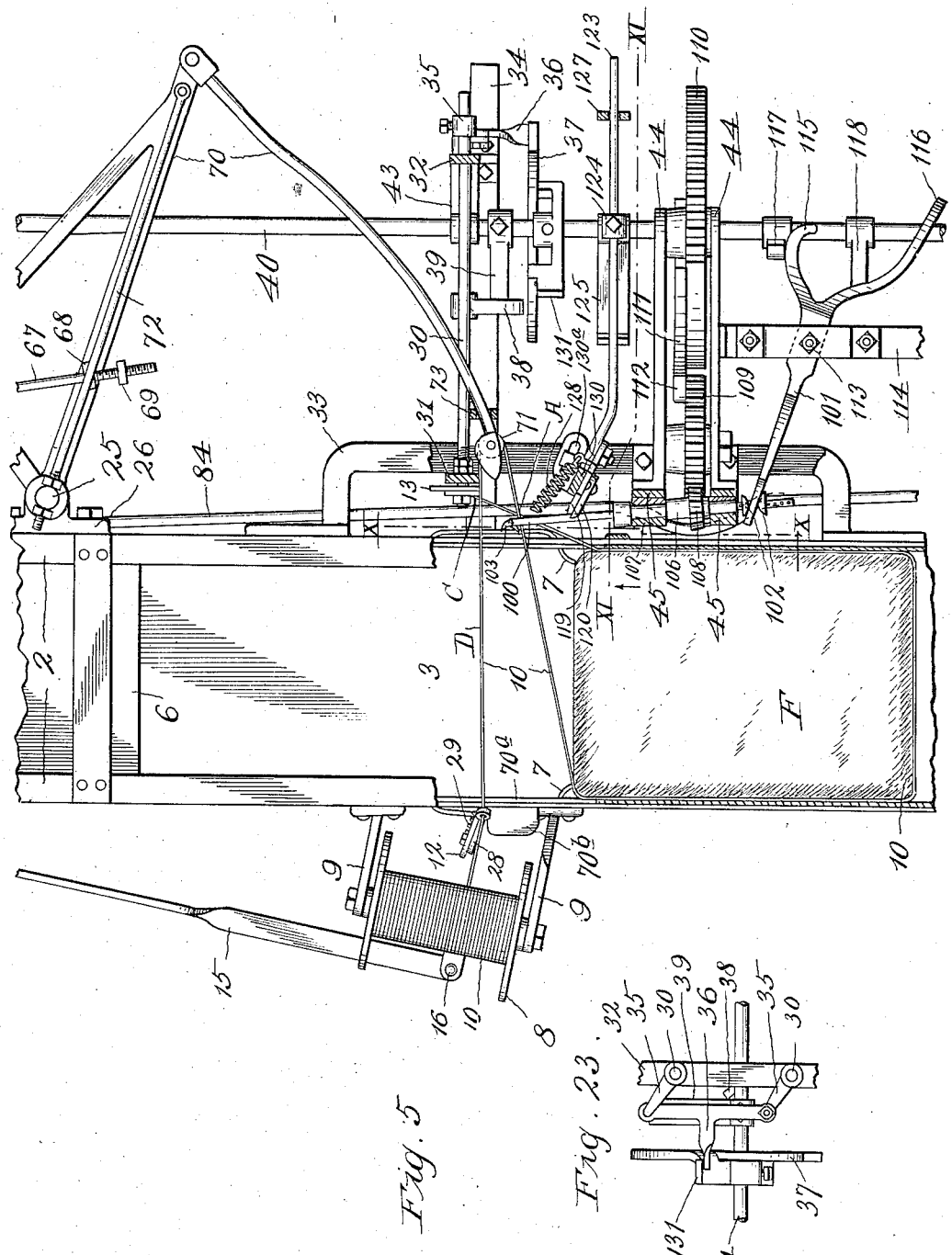
Witnesses:
R. Hamilton
M. Cox
Inventor,
C. A. Robben,
By F. G. Fischer,
Attorney.

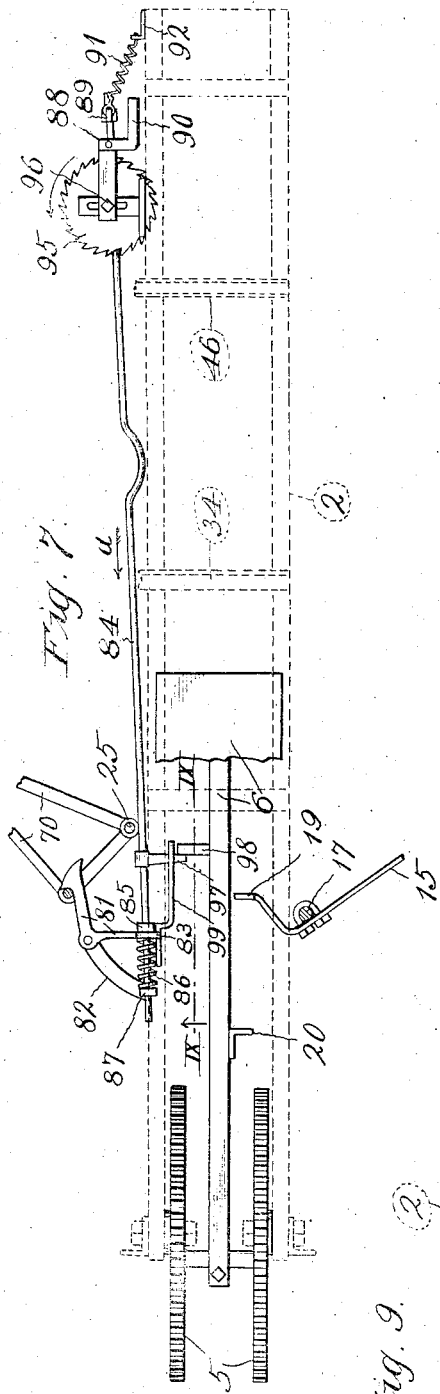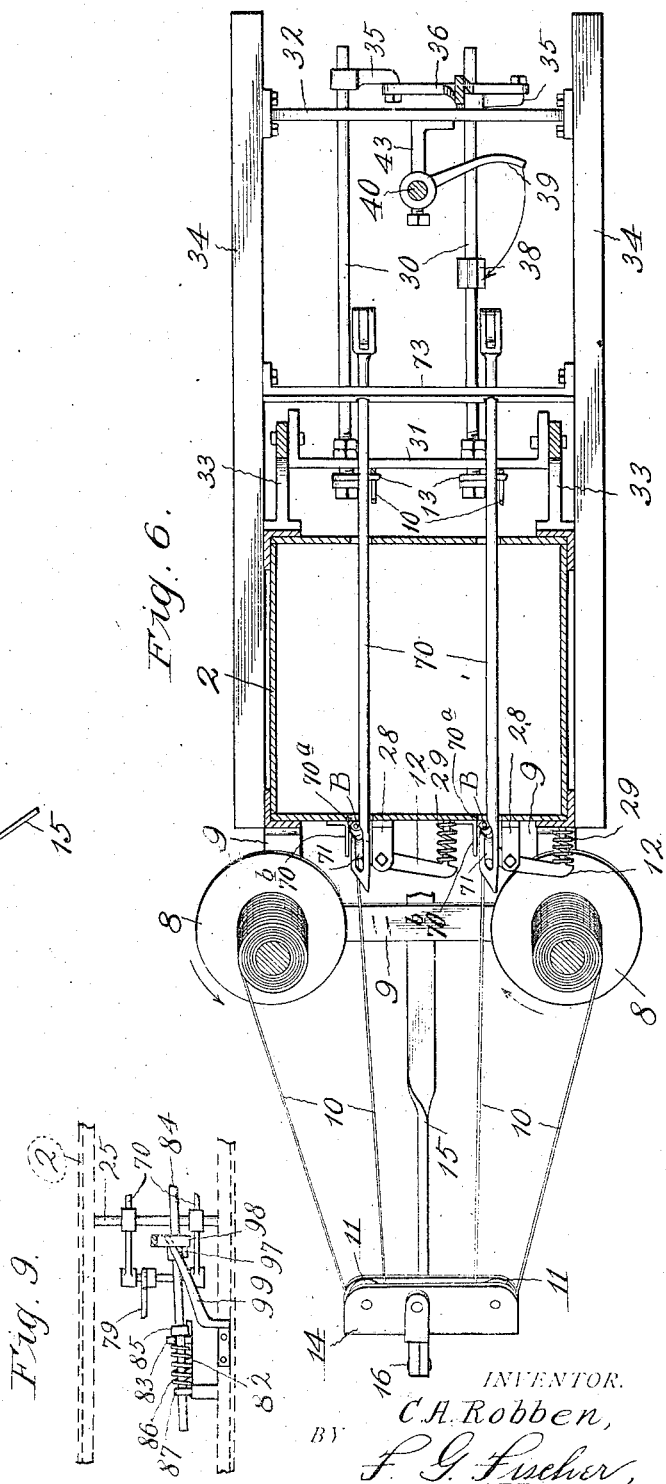

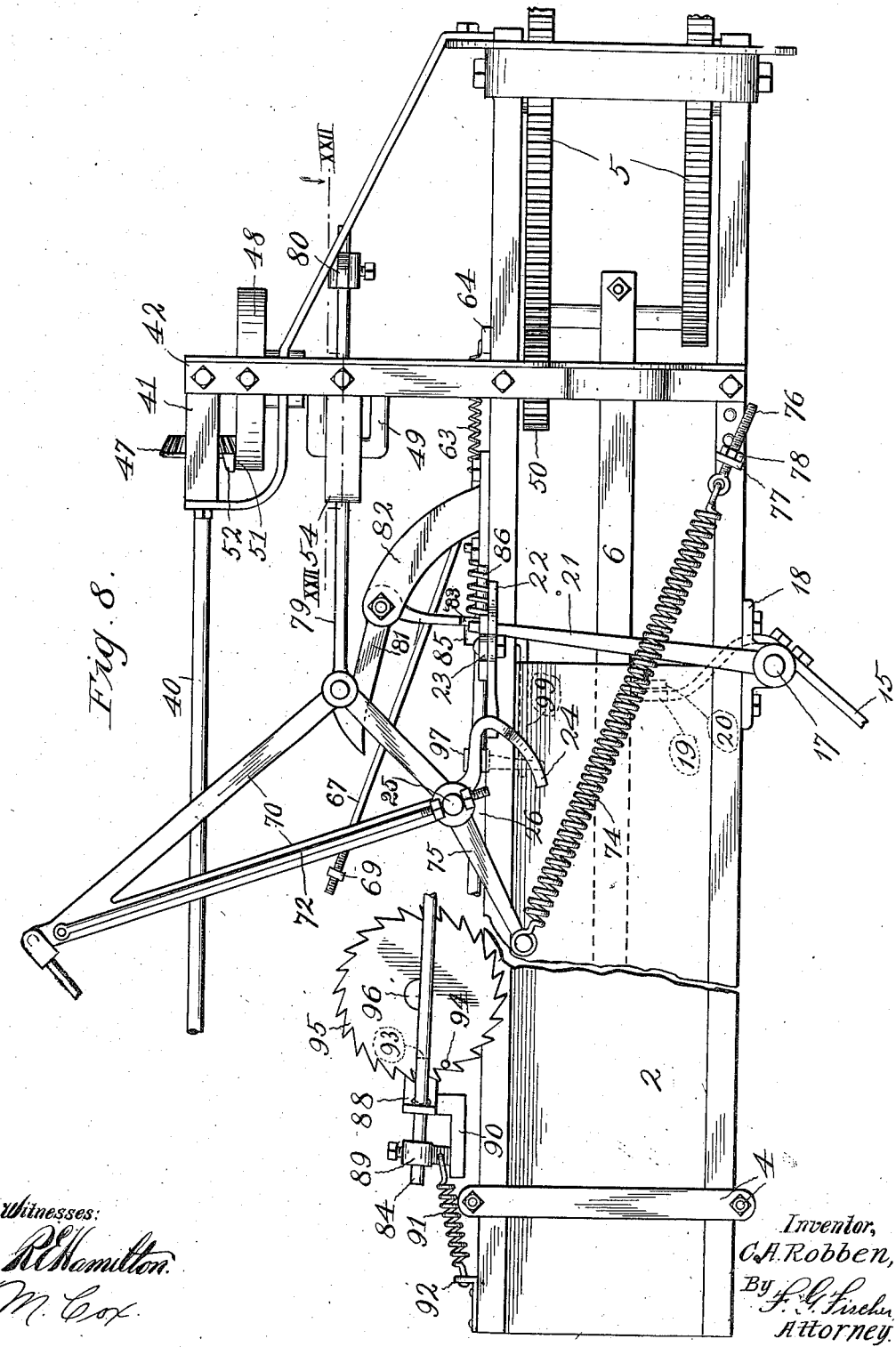

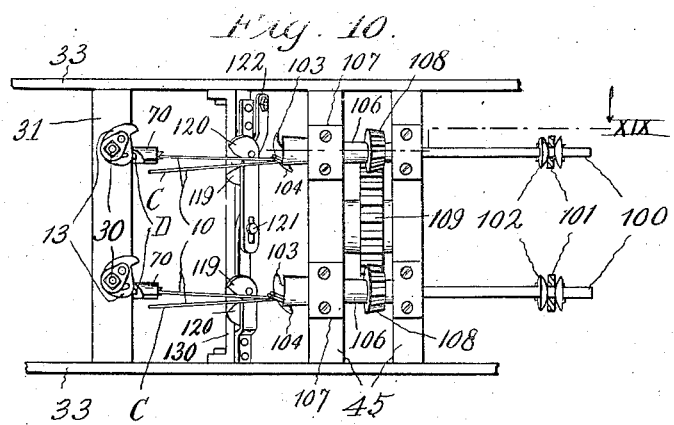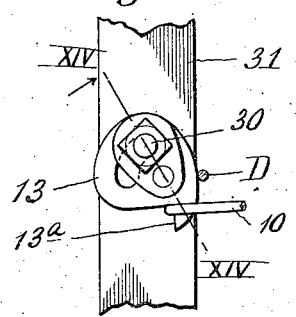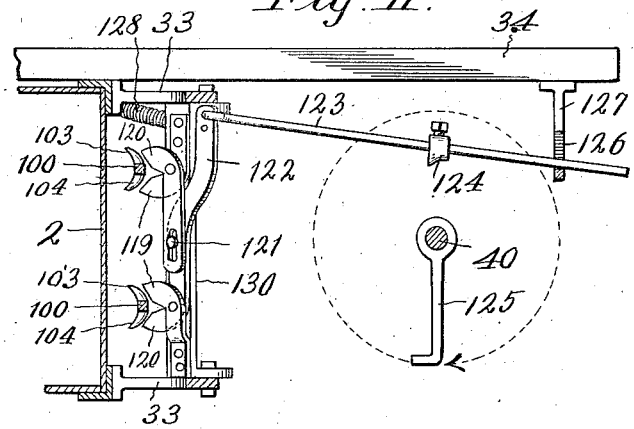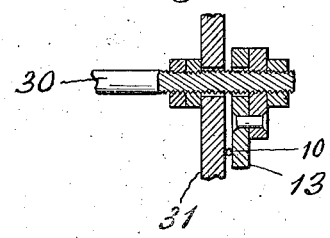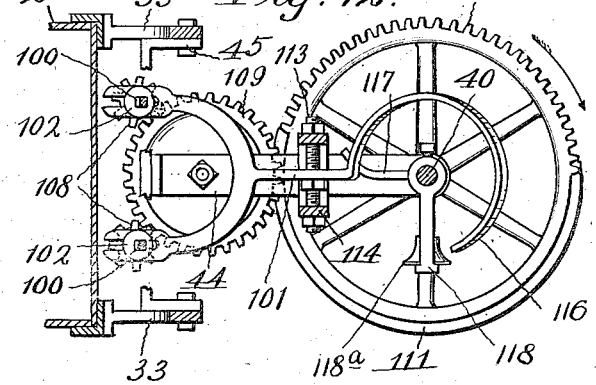

C. A. ROBBEN.
AUTOMATIC BINDING ATTACHMENT FOR BALING PRESSES.
APPLICATION FILED FEB. 24, 1909.
963,180.
Patented July 5, 1910.
9 SHEETS—SHEET 9.
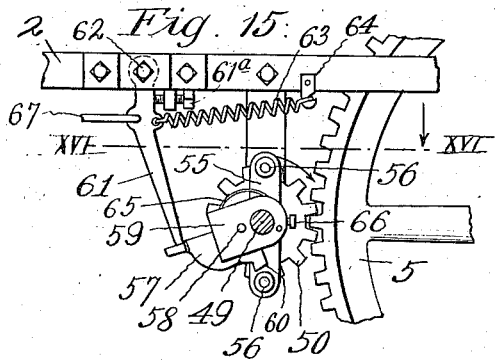
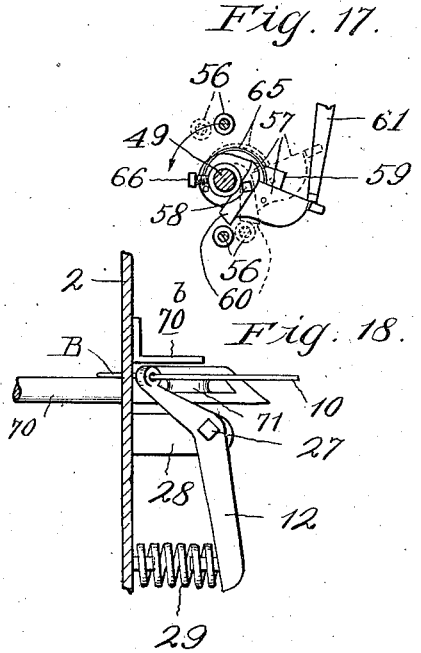
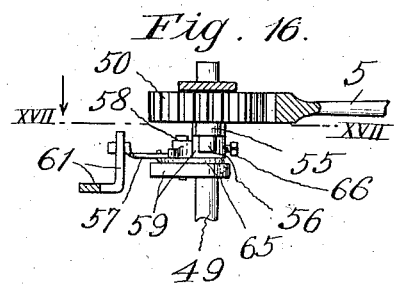
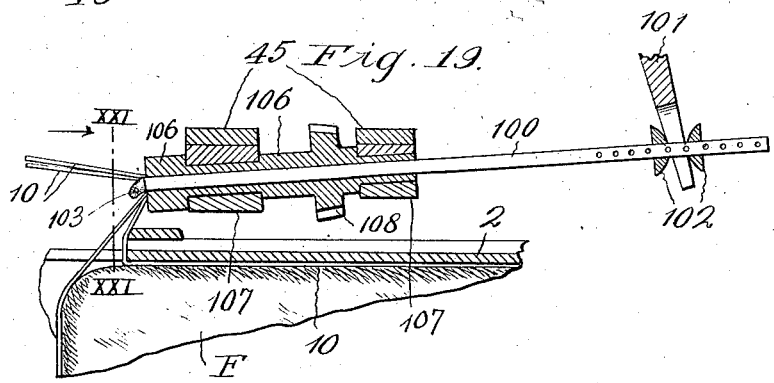
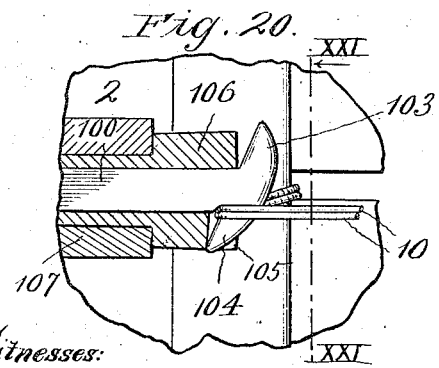
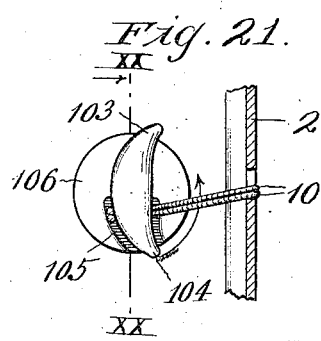
Witnesses:
R. E. Hamilton
M. Cot
Inventor,
C. A. Robben,
By F. G. Fischer,
Attorney.

UNITED STATES PATENT OFFICE.

CLEMENS A. ROBBEN, OF ANGELUS, KANSAS.

AUTOMATIC BINDING ATTACHMENT FOR BALING-PRESSES.

963,180. Specification of Letters Patent. Patented July 5, 1910.

Application filed February 24, 1909. Serial No. 479,848.

*To all whom it may concern:*

Be it known that I, CLEMENS A. ROBBEN, a citizen of the United States, residing at Angelus, in the county of Sheridan and State of Kansas, have invented certain new and useful Improvements in Automatic Binding Attachments for Baling-Presses, of which the following is a specification.

My invention relates to an automatic binding attachment for baling-presses, and my object is to provide means for taking wire from spools and binding each bale therewith, shears for severing the wire into bale-ties, and devices for twisting the ends of the bale-ties together, so that they will reliably hold the bales in shape.

Other objects of the invention will hereinafter appear, and in order that said invention may be fully understood, reference will now be made to the accompanying drawings in which:

Figure 1 shows a plan view of a baling-press provided with my attachment, the various elements thereof occupying their normal positions. Figs. 2 and 3 conjointly show a side elevation of the baling-press provided with my attachment. Fig. 4 shows a broken plan view of the baling-press with the needles forming part of the invention in their operative positions. Fig. 5 shows substantially the same parts shown in Fig. 4, with the needles restored to their normal positions. Fig. 6 is a cross section on line VI—VI of Fig. 4, with some of the parts removed. Fig. 7 is a plan view of the mechanism employed in regulating the length of the bales, the outline of the press being shown in dotted lines. Fig. 8 is a broken, inverted, plan view of the press, with some parts of my attachment removed. Fig. 9 is a section on line IX—IX of Fig. 7. Fig. 10 is a section on line X—X of Fig. 4, showing with other elements, the shears for cutting the wire into bale-ties, and the twisters for twisting the ends of the bale-ties together. Fig. 11 is a cross section on line XI—XI of Fig. 5, with a number of the parts removed. Fig. 12 is a cross section on line XII—XII of Fig. 4, with a number of the parts removed. Fig. 13 is a side elevation of one of the oscillatory wire-holders employed in carrying out the invention. Fig. 14 is a section on line XIV—XIV of Fig. 13. Fig. 15 is a section on line XV—XV of Fig. 1, showing an automatic clutch through the intermediacy of which my attachment is intermittently driven by the baling-press. Fig. 16 is a horizontal section on line XVI—XVI of Fig. 15. Fig. 17 is a section on line XVII—XVII of Fig. 16. Fig. 18 is a detail of one of a pair of levers for threading the needles, forming part of my invention. Fig. 19 is an irregular section on line XIX of Fig. 10. Fig. 20 is a broken, vertical section of one of the twisters, on line XX—XX of Fig. 21. Fig. 21 is a vertical section on line XXI—XXI of Fig. 20. Fig. 22 is a detail vertical section on line XXII—XXII of Fig. 8. Fig. 23 is a detail of means for locking the oscillatory wire holders in their operative positions. Figs. 24 and 25 are details of two bale-ties formed by my attachment.

1 designates a baling-press of ordinary or preferred type, consisting in the present instance of a baling-case 2, having a feed-opening 3, an adjusting device 4 for regulating the density of the bales, driven cog-wheels 5, a plunger 6 connected to the cog-wheels, and retainers 7. Said press is also provided with the customary hopper and the carrying-wheels, which parts have been removed in the present instance to simplify the drawings.

8 designates a pair of spools mounted in a pair of brackets 9 secured to one side of the baling-case. Said spools carry wires 10, from which the bale-ties for binding the bales are cut. The free ends of said wires are run around a pair of sheaves 11, through the eyes of a pair of levers 12, thence transversely through the baling-case, and are engaged by a pair of oscillatory wire holders 13.

Sheaves 11 form part of a tensioning device, comprising a hood 14, in which the sheaves are mounted, and a lever 15 to which said hood is pivotally connected by a bolt 16, so that the sheaves may swing laterally with the wires as the same run off the spools. Lever 15 is mounted at its inner end upon a vertical shaft 17, mounted in bearings 18 secured to the adjacent side of the baling-case, and the inner T-shaped end 19 of said lever is normally held in the path of a finger 20, secured to the adjacent side of the plunger, see Figs. 1 and 2. Lever 15 is locked in its normal position by a crank-arm 21 at the proper time by a segmental cam 24, fixed to the lower terminal of an oscillatory shaft 25, journaled in bearings 26, secured to the adjacent side of the baling-case. Levers 12 are fulcrumed upon bolts 27 extending through brackets 28, projecting from the side of the baling-case, and the lower ends of said levers are normally forced outward by expansion springs 29, interposed between said lower ends and the side of the baling-case, Fig. 18.

The wire holders 13 are adjustably secured upon the ends of a pair of horizontal shafts 30 mounted in bearing-bars 31 and 32, the former of which is secured to a pair of brackets 33, on the adjacent side of the baling-case, and the latter of which is secured to a pair of arms 34, extending laterally from the top and bottom of the baling-case, Figs. 4, 6, and 10. Shafts 30 are provided at their outer ends with crank-arms 35, connected by a T-member 36, the free end of which normally abuts against a cam-wheel 37, which, through the intermediacy of the intervening parts, normally secures the holders in an operative position, as shown in Fig. 13.

The shafts 30 are actuated at the proper time to rock the holders 13 to the position shown in Fig. 10, so they will release the wires, by a crank-arm 38, fixed to the lowermost shaft 30, and a crank-arm 39 fixed to a shaft 40, to which the cam-wheel 37 is also fixed, said cam-wheel and crank-arm being so positioned that the former will release the T-member 36 before the latter engages the crank-arm 38. Shaft 40 substantially parallels the baling-case, and is journaled in bearings carried by a bracket 41, secured to an arm 42, projecting laterally from the lower forward portion of the press, a bracket 43 extending inwardly from the bearings 32, a pair of bars 44 projecting from a pair of braces 45, secured to the brackets 33, and a pair of arms 46 projecting from the upper and lower sides of the rear portion of the baling-case.

Intermittent rotary motion is imparted to shaft 40 by a bevel pinion 47 fixed to the forward end thereof, and a mutilated bevel gear wheel 48 adapted to intermesh with said pinion and fixed upon the outer end of a crank-shaft 49, upon the inner end of which a pinion 50 intermeshing with one of the cog-wheels 5, is loosely mounted. Bevel gear 48 has the same number of teeth as pinion 47 in order to rotate the same one revolution each time said bevel gear completes a revolution. It is also provided with a semicircular peripheral flange 51, which engages a shoulder 52 on the adjacent side of pinion 47, and holds the same stationary during the first half-revolution of the bevel gear 48. The crank-portion of shaft 49 is normally supported in the horizontal position shown in Figs. 1 and 22, by means of a dog 53, pivotally secured to a bracket 54 extending upward from arm 42.

Pinion 50, which is constantly driven while the press is in operation, is intermittently locked upon the crank-shaft 49 by an automatic clutch, one member of which is fixed to said pinion and comprises an arm 55 provided with a pair of diametrically-opposed dogs 56, while the other member of the clutch comprises a latch 57 pivotally secured by a bolt 58 to a crank-arm 59, fixed to the crank-shaft 49. The shoulder 60 of latch 57 is normally held out of the path of the revolving dogs 56 by an arm 61 pivotally secured by a bolt 62 to the upper side of the baling-case, Figs. 15, 16, and 17. Arm 61 is normally held in engagement with latch 57 by a retractile spring 63, secured at its ends to said arm and a hook 64 on the adjacent side of the baling-case. The extent of the engagement of arm 61 with latch 57 is regulated by a set-screw 61$^a$, which abuts against said arm. When arm 61 is drawn out of engagement with latch 57, shoulder 60 of the same is immediately thrown into the path of the dogs 56 by a retractile spring 65, secured at its ends to the latch 57 and the crank-arm 59. Crank-arm 59 is secured to crank-shaft 49 by a set-screw 66.

Arm 61 is drawn out of engagement at the proper time, from latch 57 by means of a connecting-rod 67, having its forward end extending through an eye 68, and provided with a nut 69, which latter is arranged in the path of the former, Figs. 2 and 15. Eye 68 is secured to the uppermost one of a pair of oscillatory needles comprising a pair of toggles 70, secured at their rear ends to the oscillatory shaft 25. The needles are provided at their forward terminals with eyes containing sheaves 71, adapted to engage the wires and draw them across the baling-chamber in the rear of each bale F, Fig. 5.

The needles are reliably secured from all vertical movement by a pair of braces 72 extending from the ends of shaft 25, and a guide-bar 73 secured at its ends to brackets 33. The forward portions of the needles are swung transversely through the baling-chamber and in the rear of each bale, (Fig. 4) by means of a retractile spring 74 and a crank-arm 75, which latter is fixed to the lower terminal of shaft 25, while the former is attached at its ends to the free terminal of crank-arm 75 and an eye-bolt 76 extending through a lug 77, and provided with a nut 78, (Figs. 2 and 8) so that it may be adjusted to regulate the tension of the spring. After the needles pass through the opposite side of the baling-case, they are drawn back immediately by the crank-shaft 49 and a pull-bar 79 resting almost on said crank-shaft, (Fig. 22) and provided at its free terminal with a depending finger 80, which is engaged by said crank-portion. When the needles swing back they are prevented from contacting with the upper edges of slots 70$^a$, in the baling-case, by guides 70$^b$ secured to the adjacent sides of the baling-case, Fig. 6.

Pull-bar 79 is held in proper relation to the crank-portion of shaft 49 by the bracket 54, which has a vertical slot 54ª through which the pull-bar extends. The lower end of slot 54ª terminates in a horizontal plane just above the center of the crank-shaft, so that it will support the pull-bar and permit the crank-portion of said shaft to pass out of engagement with finger 80 when describing the lower half of its revolution.

After the needles are restored to their normal positions, they are automatically engaged by a latch 81, pivotally connected to a bracket 82, and having a bifurcated terminal 83, loosely engaging the forward portion of a trip-rod 84, provided with a collar 85 and an expansion spring 86, which engage opposite sides of terminal 83, as shown in Fig. 7, and hold the latch in engagement with the needles.

Trip-rod 84 is mounted in a bearing 87 on bracket 82 and a bearing 88 secured to the rear portion of the baling-case. Said trip-rod has both a rocking motion and a longitudinal motion, and is provided at its rear end with a finger 89 which is normally held against a stop 90 on bearing 88, by a retractile spring 91 attached at its rear terminal to a lug 92 on the rear portion of the baling-case. Said trip-rod is also provided at its rear portion with a stop 93 arranged in the path of a wrist-pin 94, depending from a bale-actuated toothed-wheel 95 journaled on a stub-shaft 96, depending from bearing 88. The forward portion of trip-rod 84 is provided with an inwardly-extending finger 97, normally held out of the path of a finger 98 on the plunger, by finger 89 and spring 91. The free end of finger 97 extends beneath the inclined portion of a releasing device 99, secured to the lower forward portion of the baling-case and adapted to disengage the finger 97 from the finger 98 after the same has moved the trip-rod in the direction of arrow a, Fig. 7, far enough to disengage latch 81 from the needles, through the intermediacy of collar 85. The needles then swing through the baling-case, engage the wires at the point B, (Fig. 4) and return to their normal positions, bringing the wires across the rear of the bale and causing them to intersect at the point A, Fig. 5.

The wires are engaged at their points of intersection by a pair of twisters 100, which are advanced for that purpose by an oscillatory lever 101, the inner bufurcated terminal of which is interposed between a pair of washers 102 adjustably secured to each twister. Each twister is provided at its forward end with an upturned beveled guide 103, which directs the wire downward into engagement with a hook 104, which draws the wire backward into a notch 105 so that it will be firmly held while its ends are being twisted together, Figs. 20 and 21. Notch 105 is located in the forward end of a shaft 106 journaled in a pair of bearings 107, secured to the inner sides of the braces 45. The twisters are square in cross section, so they will rotate with shafts 106, and yet be free to slide back and forth therein for the purpose of engaging the intersecting parts of the wires and drawing them backward into the notches 105.

Shafts 106 are provided with pinions 108 which intermesh with a small cog-wheel 109, driven by a large mutilated cog-wheel 110 fixed upon shaft 40, and having cog-teeth extending about half-way around the periphery thereof. Said cog-wheel also has a semicircular peripheral flange 111, which normally engages a shoulder 112 on the cog-wheel 109, and thereby normally locks the same, together with shafts 106 and the twisters, in position for the latter to move forward and engage the bale-wires.

Lever 101 is fulcrumed upon a bolt 113, secured to a bar 114, secured at its ends to the lowermost arm 46 and one of the bars 44. The outer end of lever 101 has an irregular prong 115, and an irregular prong 116, the former of which is arranged in the path of a crank-arm 117, while the latter is arranged in the path of a crank-arm 118. Crank-arm 118 is provided with an anti-friction roller 118ª, adapted to engage the prong 116.

The wires are severed into bale-ties E preparatory to being twisted, by a pair of shears comprising two stationary blades 119 and two movable blades 120, which latter are pivotally-mounted on the former and have a pin-and-slot connection 121, Figs. 10 and 11. One of the movable blades has an integral lever 122, to which a pull-rod 123 is connected and provided with an adjustable collar 124 arranged in the path of a crank-arm 125 fixed to shaft 40. The free end of rod 123 normally rests in the lower end of a vertical slot 126 in a bracket 127, depending from the uppermost arm 34. The shears are normally held in an open position by a retractile spring 128, attached at its ends to lever 122 and an eye 129 on the upper portion of the baling-case. Blades 119 are secured to a bar 130, fixed at its ends to brackets 33.

Assuming that the bale-wires have been properly threaded through sheaves 11, the eyes of levers 12, and the baling-case, and that their free ends are firmly engaged by the holders 13, which bind them against the bar 31, the operation of binding the initial bale, is substantially as follows: As the charges of hay are successively placed in the baling-chamber, they are advanced at each forward stroke of the plunger, and the foremost charge contacts with the wires and pushes the same backward therewith. In its backward travel the bale, being formed by said charges, engages the toothed-wheel 95, rotates the same about one revolution or until its wrist-pin engages stop 93 and thereby rocks the trip-rod until its finger 89 engages stop 90. This brings finger 97 of the trip-rod into the path of finger 98 on the plunger, so that when the latter makes its backward stroke, said fingers will engage and the trip-rod will be drawn backward with the plunger until finger 97 is drawn out of engagement with finger 98 by the inclined releasing device 99. As the trip-rod moves back with the plunger, it will, through collar 85, disengage latch 81 from the needles, which are immediately swung transversely through the baling-case and in the rear of the bale by spring 74 to the position shown in Fig. 4. The front beveled edges of the needles in passing by levers 12, raise the upper ends of the same so that they in turn will raise the portions B of the bale-wires over the needles, after which said levers are immediately restored to their normal positions by springs 29, and carry the wires down into the paths of sheaves 71, (Figs. 6 and 18) so that the needles, which are almost immediately restored to their normal positions by crank-shaft 49 and pull-bar 79, will carry the bale-wires to the position shown in Fig. 5. As the needles swing forward through the baling-case, the segmental cam 24 throws latch 22 out of engagement with crank-arm 21, leaving lever 15 of the tensioning device free to be drawn toward the spools by the needles and the intervening portions of the bale-wires, when said needles swing backward to their normal positions. This gives the needles sufficient slack wire to pass backward behind the bale to the position shown in Fig. 5, without removing any wire from the spools and thereby causing the same to rotate rapidly and pay out too much wire. About the time the needles are restored to their normal positions, finger 20 on the now forwardly moving plunger contacts with the T-shaped end of lever 15 and restores the same to its normal position, where it is again locked by the crank-arm engaging latch 22. In swinging out to its normal position, lever 15 slowly unwraps sufficient wire from the spools to accommodate the needles when they swing backward in the rear of the next bale. When the needles swing forward through the baling-case, as above described, they will, through the intermediacy of connecting-rod 67, draw arm 61 out of engagement with latch 57 and permit spring 65 to throw shoulder 60 into the path of dogs 56 (Fig. 17) and thereby lock the constantly rotating pinion 50 on the crank-shaft 49 for the purpose of rotating the same.

During the first half revolution of the crank-shaft, it engages finger 80 and through pull-bar 67 restores the needles to their normal positions. As the crank-shaft describes the last half of its revolution, the toothed portion of the bevel gear 48 engages the bevel pinion 47, and thereby rotates shaft 40 one revolution. While shaft 40 is describing the first quarter of its revolution, crank-arm 117 engages prong 115 and throws the inner end of lever 101, together with the twisters 100, forward until hooks 104 engage the bale-wires at their intersecting points A. Crank-arm 117 then passes out of engagement with prong 115 and crank-arm 118 immediately engages prong 116, and forces the inner end of lever 101 backward with the twisters until hooks 104 enter notches 105, as shown in Fig. 20, when the crank-arm 118 passes out of engagement with the prong 116. Shaft 40 has now described a half-revolution, and brought the mutilated cog-wheel 110 into mesh with the cog-wheel 109, so that it will, through the intermediacy of the intervening gearing, rotate the twisters and thereby tie or twist the ends of the bale-ties E together, said ends having been previously severed by the shears, which are actuated through the instrumentality of pull-rod 123 and the crank-arm 125, these parts being so timed as to actuate the shears immediately after the twisters have drawn the wires into notches 105. Immediately after the twisters have tied the ends of the bale-ties together, they are moved forward to their normal positions (Figs. 1 and 4) by crank-arm 117 engaging prong 115 just before shaft 40 comes to rest. In moving forward the rearwardly inclined hooks 104 of the twisters slip out of the loops e which they formed in the bale-ties E that have been bound around the outwardly moving bale. As the twisters move backward toward the notches 105 with the intersecting wires, as above described, holders 13 release the terminals C thereof, said holders being rocked upward to the position shown in Fig. 10, through the intermediacy of crank-arm 39, crank-arm 38, shafts 30, and the connecting elements 35 and 36. The holders are then rocked to their lower positions by the terminal 131 of the segmental cam 37 engaging the laterally-projecting end of the T-member 36 (Fig. 23) and depressing it and crank-arms 35 to the position shown in Fig. 3. As the holders rock downward, they engage portions D of the wires, which are held in the paths of their hook portions 13$^a$ by the needles (Fig. 5), and hold said wires in the path of the next bale. After the needles, holders, shears, and twisters have been restored to normal, shafts 40 and 49 have completed a revolution and remain at rest by reason of the clutch-member on shaft 49 being thrown out of engagement with the companion member on pinion 50 through arm 61, which is drawn into the path of said companion member by spring 63 immediately after the needles have been restored to normal. The parts now remain at rest until the next bale rotates wheel 95 another revolution, when the operation of the binding attachment is repeated.

From the foregoing description it will be understood that while wheel 95 is rotated by the bales, it really controls the length of said bales and forms the primary controlling member of the attachment, as the needles and the rest of said attachment are actuated on the completion of each revolution thereof. To increase the length of the bales, it is only necessary to substitute a wheel of larger diameter, and in order to prevent the larger wheel from becoming embedded too deeply in the bale, I slot the member carrying shaft 96, so that said shaft may be set farther from the baling-case.

In order to form the twist, or the tie, on the bale E' (Fig. 25), it is only necessary to adjust the shears closer to the adjacent ends of shafts 106, so that when the shears cut the wire into bale-ties the ends thereof will be too short to wrap around those portions of the ties between the baling-case and hooks 104, consequently, when the hooks are rotated said portions only will be twisted. The slotted ends 130ª of bar 130 allow for the ready adjustment, above referred to, of the shears.

Having thus described my invention, what I claim is:—

1. The combination with a baling-press, of a pair of holders for securing wire in front of each bale, rock-shafts upon which said holders are mounted, means connecting said rock-shafts so they will operate in unison, and means actuated by the baling-press for operating said rock-shafts.

2. The combination with a baling-press, of holders for securing wire in front of each bale, rock-shafts upon which said holders are mounted, means including a T-member connecting said rock-shafts so they will operate in unison, a cam adapted to rock the shafts in one direction and secure them in one position by engaging the T-member, a crank-member on one of the rock-shafts, and means for engaging said crank-member to rock the shafts in an opposite direction.

3. The combination with a baling-press, of holders for securing wire in front of each bale, rock-shafts upon which said holders are mounted, means including a T-member connecting said rock-shafts so they will operate in unison, a cam adapted to rock the shafts in one direction and secure them in one position by engaging the T-member, a crank-member on one of the rock-shafts, and a rotary member for engaging said crank-member to rock the shafts in an opposite direction.

4. The combination with a baling-press, of holders for securing wire in front of each bale, rock-shafts upon which said holders are mounted, means including a T-member connecting said rock-shafts so they will operate in unison, a rotary member adapted to rock the shafts in one direction and secure them in one position by engaging the T-member, a crank-member on one of the rock-shafts, and means for engaging said crank-member to rock the shafts in an opposite direction.

5. The combination with a baling-press, of means for placing bale-ties around each bale, twisters for twisting or tying the ends of the bale-ties together, shafts in which the twisters are slidably mounted, pinions on said shafts, an intermediate cog-wheel engaging said pinions and provided with a shoulder, a mutilated cog-wheel adapted to engage said intermediate cog-wheel and provided with a peripheral flange adapted to engage the shoulder on said intermediate cog-wheel, and means actuated by the baling-press for imparting intermittent rotary motion to said mutilated cog-wheel.

6. The combination with a baling-press, of twisters for twisting or tying the ends of bale-ties after they have been placed around each bale, means for rotating said twisters, a lever for sliding said twisters back and forth, said lever being provided with prongs, and rotary means for engaging the prongs to oscillate the lever.

7. The combination with a baling-press, of twisters for twisting or tying the ends of bale-ties after they have been placed around each bale, means for rotating said twisters, a lever for sliding said twisters back and forth, said lever being provided with prongs, crank-arms which alternately engage said prongs to oscillate the lever, and means actuated by the baling-press for imparting intermittent rotary motion to said crank-arms.

8. The combination with a baling-press, of means for holding wire in front of each bale, oscillatory needles for drawing the wire behind each bale, a latch for normally locking said needles in an inoperative position, and means actuated by each bale for disengaging said latch from the needles.

9. The combination with a baling-press, of means for holding wire in front of each bale, needles for drawing the wire behind each bale, means for swinging the needles through the baling-press, a pull-bar for restoring said needles to normal, and means actuated by the baling-press for operating said pull-bar.

10. The combination with a baling-press, of means for holding wire in front of each bale, needles for drawing the wire behind each bale, means for swinging the needles through the baling-press, a pull-bar for restoring said needles to normal, a finger on said pull-bar, and a crank-shaft having intermittent rotary motion and adapted to engage the finger and actuate the pull-bar.

11. The combination with a baling-press, of means for holding wire in front of each bale, oscillatory needles for drawing the wire behind each bale, sheaves at the forward end of the needles, and levers having eyes through which the wire extends, said levers being adapted to lay the wire in the paths of the sheaves.

12. The combination with a baling-press, of means for holding wire in front of each bale, a tensioning device for said wire, means for locking said tensioning device in its normal position, oscillatory needles for drawing the wire behind each bale, and means acting simultaneously with the needles for releasing the tensioning device locking means.

13. The combination with a baling-press, of means for holding wire in front of each bale, a tensioning device for said wire, means for locking said tensioning device in its normal position, oscillatory needles for drawing the wire behind each bale and actuating the tensioning device, means acting simultaneously with the needles for releasing the tensioning device locking means, and means for restoring the tensioning device to its normal position.

14. The combination with a baling-press, of means for holding wire in front of each bale, a tensioning device for said wire, means for locking said tensioning device in its normal position, oscillatory needles for drawing the wire behind each bale and actuating the tensioning device, means acting simultaneously with the needles for releasing the tensioning device locking means, and means on the plunger of the baling-press for restoring said tensioning device to normal.

15. The combination with a baling-press, of means for holding wire in front of each bale, needles for drawing the wire behind each bale, means for locking the needles in their normal positions, and a trip-rod for disengaging said locking means from the needles.

16. The combination with a baling-press, of means for holding wire in front of each bale, needles for drawing the wire behind each bale, means for locking the needles in their normal positions, a trip-rod actuated by the baling-press for disengaging said locking means from the needles, and means actuated by each bale for placing the trip-rod in position to be operated.

17. The combination with a baling-press, of means for holding wire in front of each bale, needles for drawing the wire behind each bale, means for actuating said needles, a locking device for holding the needles in their normal positions, a trip-rod for disengaging said locking device from the needles, and a wheel operated by each bale for placing the trip-rod in position to be actuated.

18. The combination with a baling-press, of means for holding wire in front of each bale, needles for drawing the wire behind each bale, means for actuating said needles, a locking device for holding the needles in their normal positions, a trip-rod actuated by the plunger of the baling-press for disengaging said locking device from the needles, a releasing device for disengaging the trip-rod from the plunger, and means for restoring said trip-rod to normal.

19. The combination with a baling-press, of means for holding wire in front of each bale, needles for drawing the wire behind each bale, means for actuating said needles, means for locking the needles in their normal positions, a trip-rod actuated by the baling-press for disengaging said locking means from the needles, a stop on said trip-rod, a toothed-wheel actuated by each bale, and a wrist-pin carried by said wheel and adapted to engage the stop on the trip-rod for throwing the same in position to be actuated.

20. The combination with a baling-press, of means for holding wire in front of each bale, needles for drawing the wire behind each bale, means for locking the needles in their normal positions, a trip-rod for disengaging said locking means from the needles, means for drawing the needles through the baling-press, a crank-shaft for returning said needles to normal, a driven gear wheel loosely-mounted on said crank-shaft, a clutch-member carried by said gear wheel, a clutch-member on the crank-shaft adapted to engage the clutch-member on the gear wheel and lock the same on the shaft, and means actuated by the needles for normally holding the clutch-members out of engagement with each other.

21. The combination with a baling-press, of holders for securing wire in front of each bale, means including a shaft for actuating said holders, a gear wheel on said shaft, a mutilated gear wheel for imparting intermittent motion to the first-mentioned gear wheel, a second shaft carrying the mutilated gear wheel, a clutch-member on said second shaft, a clutch-member driven by the baling-press and adapted to rotate the first-mentioned clutch-member, a device for normally holding said clutch-members out of engagement with each other, and means controlled by the bales for throwing said device to an inoperative position.

22. The combination with a baling-press, of holders for securing wire in front of each bale, means including a shaft for actuating said holders, a bevel gear wheel on said shaft provided with a shoulder, a mutilated bevel gear wheel for imparting intermittent motion to the first-mentioned gear wheel and provided with a segmental peripheral flange adapted to engage the shoulder on the first-mentioned bevel gear wheel, a second shaft carrying the mutilated bevel gear wheel, a clutch-member on said second shaft, a clutch-member driven by the baling-press for rotating the first-mentioned clutch-member, an arm for normally holding said clutch-members out of engagement with each other, and means controlled by the bales for throwing said arm to an inoperative position.

23. The combination with a baling-press, of means for placing wire around each bale, shears for severing the wire into bale-ties, means including a shaft for actuating said shears, a gear wheel on said shaft, a mutilated gear wheel for imparting intermittent motion to the first-mentioned gear wheel, a second shaft carrying the mutilated gear wheel, a clutch-member on said second shaft, a clutch-member driven by the baling-press and adapted to rotate the first-mentioned clutch-member, a device for normally holding said clutch-members out of engagement with each other, and means controlled by the bales for throwing said device to an inoperative position.

24. The combination with a baling-press, of means for placing wire around each bale, shears for cutting the wire into bale-ties, means including a shaft for actuating said shears, a bevel gear wheel on said shaft provided with a shoulder, a mutilated bevel gear wheel for imparting intermittent motion to the first-mentioned gear wheel and provided with a segmental peripheral flange adapted to engage the shoulder on the first mentioned bevel gear wheel, a second shaft carrying the mutilated bevel gear wheel, a clutch-member on said second shaft, a clutch-member driven by the baling-press for rotating the first-mentioned clutch-member, an arm for normally holding said clutch-members out of engagement with each other, and means controlled by the bales for throwing said arm to an inoperative position.

25. The combination with a baling-press, of means for placing bale-ties around each bale, twisters for twisting or tying the ends of the bale-ties together, means including a shaft for actuating said twisters, a gear wheel on said shaft, a mutilated gear wheel for imparting intermittent motion to the first-mentioned gear wheel, a second shaft carrying the mutilated gear wheel, a clutch-member on said second shaft, a clutch-member driven by the baling-press and adapted to rotate the first-mentioned clutch-member, a device normally holding said clutch-members out of engagement with each other, and means controlled by the bales for throwing said device to an inoperative position.

26. The combination with a baling-press, of means for placing bale-ties around each bale, twisters for twisting or tying the ends of the bale-ties together, means including a shaft for actuating said twisters, a bevel gear wheel on said shaft provided with a shoulder, a mutilated bevel gear wheel for imparting intermittent motion to the first-mentioned gear wheel and provided with a segmental peripheral flange adapted to engage the shoulder on the first-mentioned bevel gear wheel, a second shaft carrying the mutilated bevel gear wheel, a clutch-member on said second shaft, a clutch-member driven by the baling-press for rotating the first-mentioned clutch-member, an arm for normally holding said clutch-members out of engagement with each other, and means controlled by the bales for throwing said arm to an inoperative position.

27. The combination with a baling-press, of means for holding wire in front of each bale, needles for drawing the wire behind each bale, means for swinging the needles through the baling press, a pull-bar for restoring said needles to normal, a finger on said pull-bar, a crank-shaft having intermittent rotary motion and adapted to engage the finger and actuate the pull-bar, and means for supporting the crank-portion of said shaft when at rest.

28. The combination with a baling-press, of means for holding wire in front of each bale, needles for drawing the wire behind each bale, means for swinging the needles through the baling-press, a pull-bar for restoring said needles to normal, a finger on said pull-bar, a crank-shaft having intermittent rotary motion and adapted to engage the finger and actuate the pull-bar, and a pivoted dog for supporting the crank-portion of said shaft in a horizontal position.

In testimony whereof I affix my signature, in the presence of two witnesses.

CLEMENS A. ROBBEN.

Witnesses:
   F. G. Fischer,
   M. Cox.